(12) United States Patent
Chen et al.

(10) Patent No.: US 9,001,292 B2
(45) Date of Patent: Apr. 7, 2015

(54) COLOR FILTER AND LIQUID CRYSTAL DISPLAY

(75) Inventors: Kuei-Bai Chen, Hsin-Chu (TW); Chien-Kai Chen, Hsin-Chu (TW); Chen-Hsien Liao, Hsin-Chu (TW); Chia-Hao Li, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 246 days.

(21) Appl. No.: 13/463,907

(22) Filed: May 4, 2012

(65) Prior Publication Data

US 2013/0128195 A1    May 23, 2013

(30) Foreign Application Priority Data

Nov. 17, 2011   (TW) .............. 100142062 A (51) Int. Cl.
*G02F 1/1335* (2006.01)
*G02B 5/20* (2006.01)
*G02B 5/22* (2006.01)

(52) U.S. Cl.
CPC .......... *G02F 1/133514* (2013.01); *G02B 5/201* (2013.01); *G02B 5/223* (2013.01)

(58) Field of Classification Search
CPC .................................. G02F 1/133514
USPC ..................................... 349/61, 106
See application file for complete search history.

(56) References Cited

U.S. PATENT DOCUMENTS

| | | | |
|---|---|---|---|
| 5,168,094 A | 12/1992 | Shuttleworth et al. | |
| 5,792,587 A | 8/1998 | Chapman et al. | |
| 6,162,761 A | 12/2000 | Chapman et al. | |
| 6,365,304 B2 | 4/2002 | Simons | |
| 6,723,835 B1 * | 4/2004 | Millard et al. | 534/772 |
| 2010/0171911 A1 * | 7/2010 | Anno et al. | 349/109 |
| 2012/0038267 A1 * | 2/2012 | Hanamura et al. | 313/504 |

* cited by examiner

*Primary Examiner* — Nathanael R Briggs
(74) *Attorney, Agent, or Firm* — WPAT, PC; Justin King (57) ABSTRACT

Disclosed herein is a color filter, which includes a substrate and a green color resist. The green color resist is disposed on the substrate. The green color resist has a function $A(\lambda)$ defined by a product of the transmittance spectrum of the green color resist and the CIE color matching function $\bar{z}(\lambda)$. The function $A(\lambda)$ has a maximum of less than 0.28, and the function $A(\lambda)$ satisfies the following formula (II):

$$\int_{380}^{780} A(\lambda)d\lambda > 10.26 \qquad \text{formula (II).}$$

18 Claims, 9 Drawing Sheets

COLOR FILTER AND LIQUID CRYSTAL DISPLAY

RELATED APPLICATIONS

This application claims priority to Taiwan Application Serial Number 100142062, filed Nov. 17, 2011, which is herein incorporated by reference.

BACKGROUND

1. Technical Field

The present disclosure relates to a color filter. More particularly, the present disclosure relates to a color filter for a liquid crystal display device.

2. Description of Related Art

Various different types of liquid crystal display devices are in use today. For the purpose of exhibiting colors, color filters are provided in liquid crystal display devices. Accordingly, color filters influence the optical performance (i.e., brightness and chromaticity) of liquid crystal display devices. Color filters typically include red color resists, green color resists and blue color resists, in which the green color resists have the greatest influence on the brightness of the liquid crystal display devices. In general, there is a trade-off between chromaticity and brightness (i.e., transmittance) in conventional color filters. Particularly, if the transmittance of a color filter is increased, the chromaticity thereof is sacrificed. On the other hand, if the chromaticity of a color filter is improved, the transmittance thereof is decreased. Therefore, there exists in this art a need for a new color filter which is capable of resolving these issues and that improves the optical performance of liquid crystal display devices.

SUMMARY

According to one aspect of the present disclosure, a color filter is provided. The color filter is characterized in providing improvement in both transmittance and chromaticity. The color filter includes a substrate and a green color resist. The green color resist is disposed on a surface of the substrate. The green color resist has a transmittance spectrum $T(\lambda)$ which is a function of the wavelength $\lambda$ of light passing through the green color resist, and a function $A(\lambda)$ defined by a product of the transmittance spectrum $T(\lambda)$ and a CIE color matching function $\bar{z}(\lambda)$. The function $A(\lambda)$ may be represented by the following formula (I):

$$A(\lambda)=T(\lambda)\times\bar{z}(\lambda) \quad \text{formula (I)},$$

wherein the function $A(\lambda)$ has a maximum of less than 0.28 when the wavelength $\lambda$ is in the range from 380 nm to 780 nm, and the function $A(\lambda)$ satisfies the requirements of the following formula (II):

$$\int_{380}^{780} A(\lambda)d\lambda > 10.26 \quad \text{formula (II)}.$$

In one embodiment, the green color resist comprises a green pigment and a yellow dye.

In one embodiment, the yellow dye is selected from the group consisting of nitro dye, diphenylmethane dye, azo dye, thiazol, azine, acridine, quinoline and a combination thereof.

In one embodiment, the green pigment is phthalocyanine.

In one embodiment, the function $A(\lambda)$ satisfies the requirements of the following formula (III):

$$\int_{380}^{780} A(\lambda)d\lambda > 10.3 \quad \text{formula (III)}.$$

In one embodiment, the maximum of the function $A(\lambda)$ is less than 0.27.

In one embodiment, the green color resist has a thickness of about 1 μm to about 3 μm.

In one embodiment, the green color resist has a chromaticity x of 0.28 to 0.327 and a chromaticity y of 0.6 to 0.62 in the CIE 1931 chromaticity diagram, in which a CIE standard illuminant C is used as a theoretical light source.

In one embodiment, the color filter further comprises a red color resist and a blue color resist. Both red and blue color resists are disposed on the surface of the substrate.

According to another aspect of the present disclosure, a liquid crystal display device is provided. The liquid crystal display device includes a color filter according to any embodiment described above, an active array substrate, a liquid crystal layer and a backlight module. The liquid crystal layer is disposed over the active array substrate. The color filter is disposed over the liquid crystal layer. The backlight module is disposed below the active array substrate and configured to emit a light.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
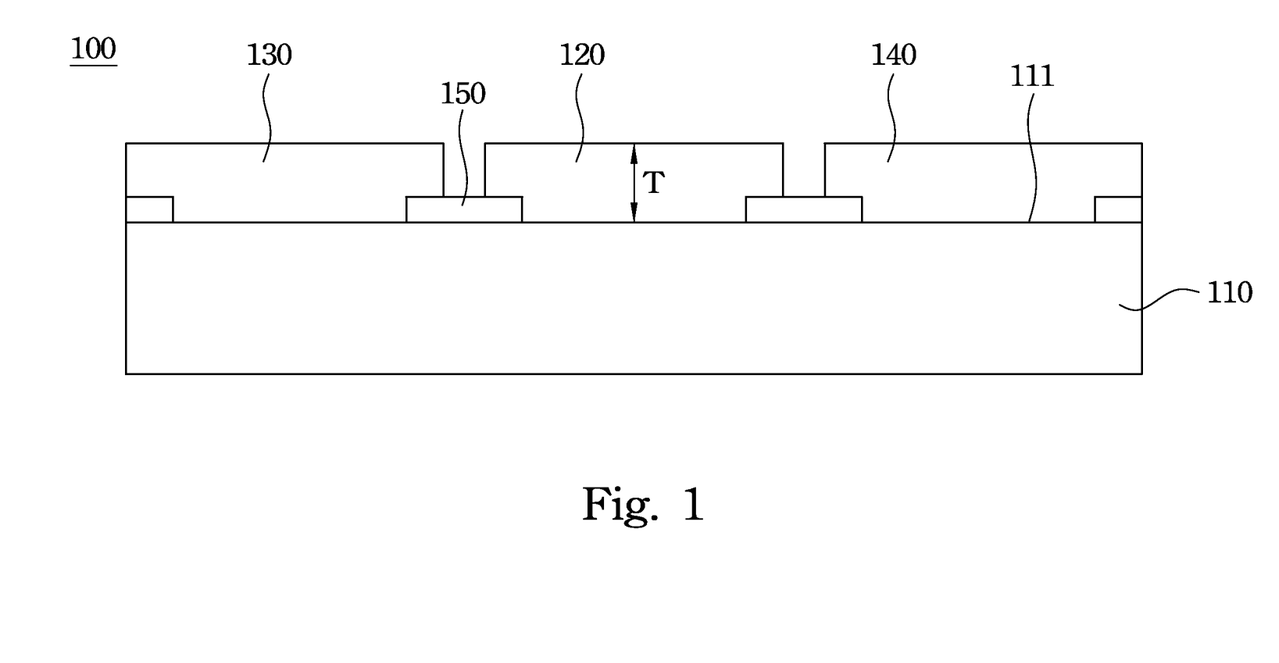
FIG. 1 is a cross-sectional view schematically illustrating a color filter according to one embodiment of the present disclosure.

FIG. 1 is a cross-sectional view schematically illustrating a color filter 100 according to one embodiment of the present disclosure. The color filter 100 includes a substrate 110 and a green color resist 120.

The substrate 110 is configured to support the green color resist 120 disposed thereon, and the substrate 110 may be a glass substrate or other transparent substrate. There is no specific limitation on the material and the thickness of the substrate 100, so long as it has a sufficient mechanical strength and a desired transmittance.

Figure 2:
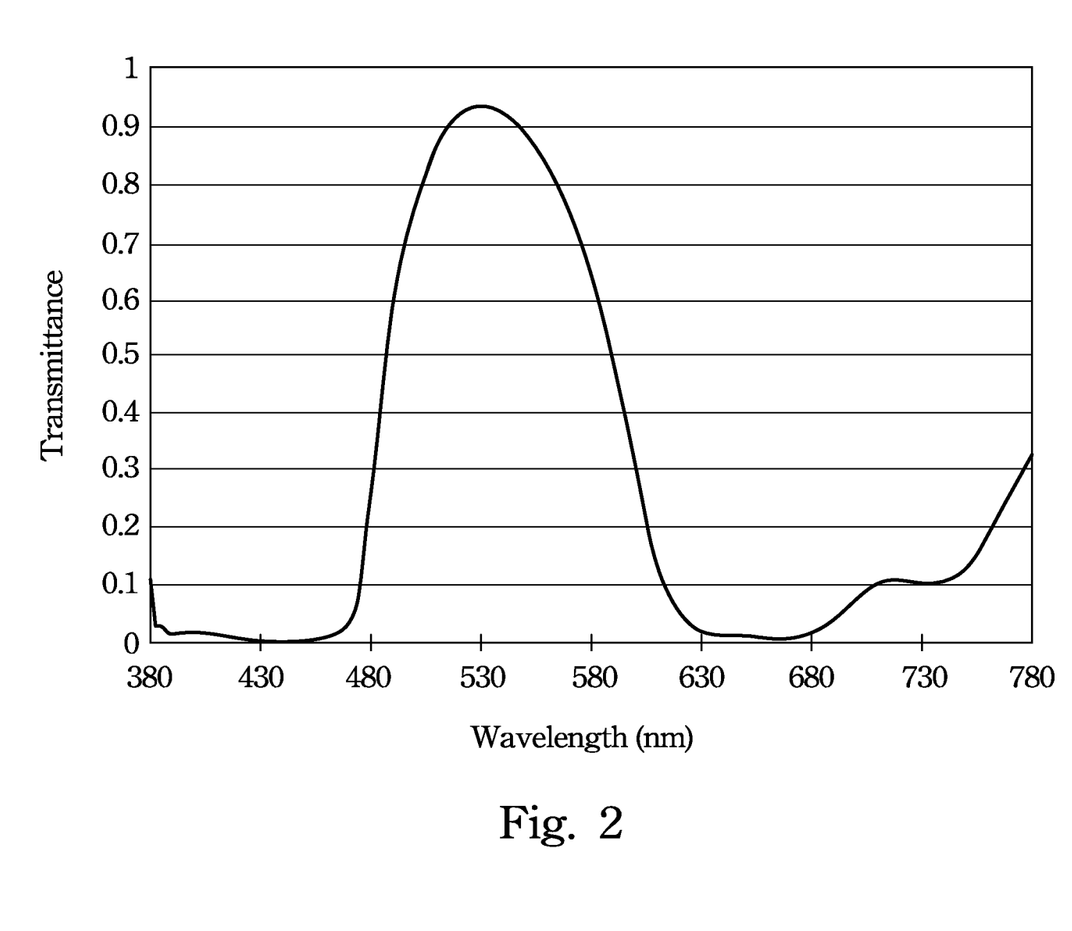
FIG. 2 is a graph showing the transmittance spectrum of a green color resist according to one embodiment of the present disclosure.

The green color resist 120 is disposed on a surface 111 of the substrate 110. According to one embodiment of the present disclosure, the green color resist 120 has a transmittance spectrum T(λ) which is a function of the wavelength λ of light passing through the green color resist 120, as depicted in FIG. 2. In the present disclosure, the maximum of the transmittance spectrum T(λ) is defined as "1," whereas the minima of the transmittance spectrum T(λ) is defined as "0." In other words, when the transmittance is 100%, the transmittance spectrum T(λ) has a value of one, and when the transmittance is 0%, the transmittance spectrum T(λ) has a value of zero. The transmittance spectrum T(λ) depicted in FIG. 2 has a high transmittance in the wavelength range of about 500 nm to about 600 nm. Accordingly, when light is transmitted through the green color resist 120, it may exhibit a green color. The transmittance spectrum T(λ) may have a maximum of greater than 0.9 in the wavelength range of visible light (380-780 nm).

The green color resist 120 has a function A(λ) defined by a product of the transmittance spectrum T(λ) of the green color resist 120 and a CIE color matching function $\bar{z}(\lambda)$. That is, the function A(λ) may be represented by the following formula (I):

$$A(\lambda) = T(\lambda) \times \bar{z}(\lambda) \quad \text{formula (I)}.$$

Figure 3:
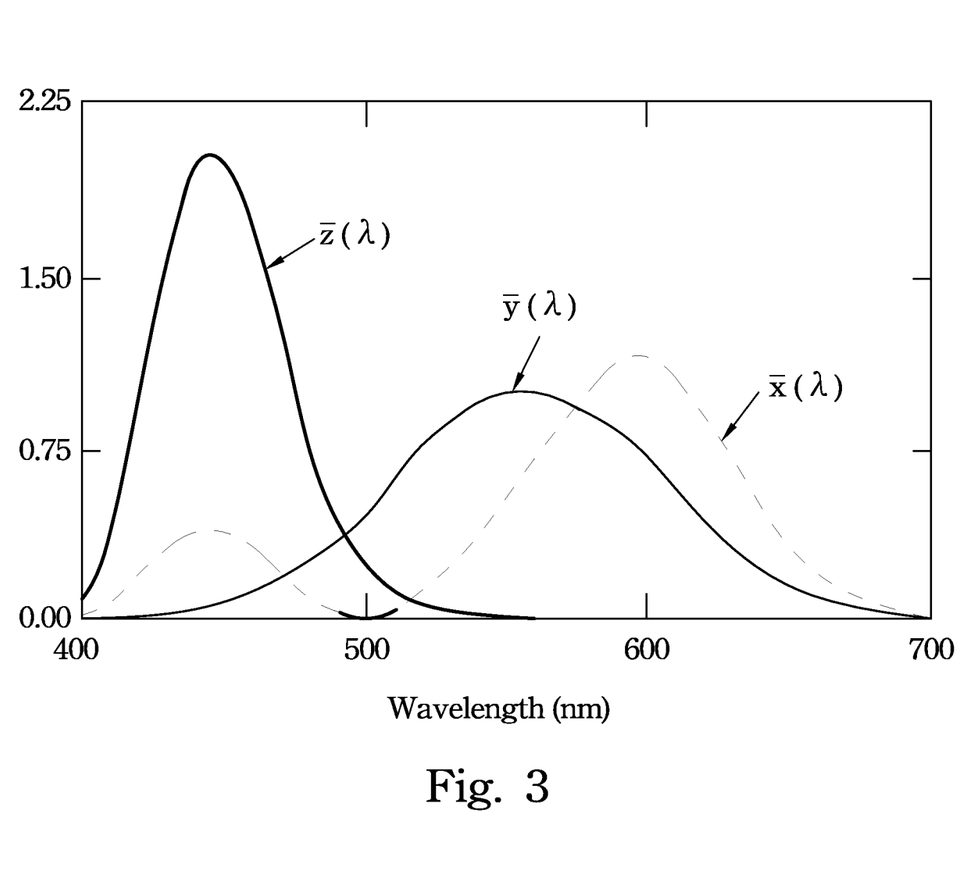
FIG. 3 is a graph showing a set of CIE 1964 10° color matching functions.

In one embodiment, the CIE color matching function $\bar{z}(\lambda)$ is one of the CIE 1964 10° color matching functions. FIG. 3 is a graph depicting a set of CIE 1964 10° color matching functions. The CIE 1964 10° color matching functions include the color matching function $\bar{x}(\lambda)$, the color matching function $\bar{y}(\lambda)$ and the color matching function $\bar{z}(\lambda)$, in which the color matching function $\bar{z}(\lambda)$ is used to define the function A(λ).

Figure 4A:
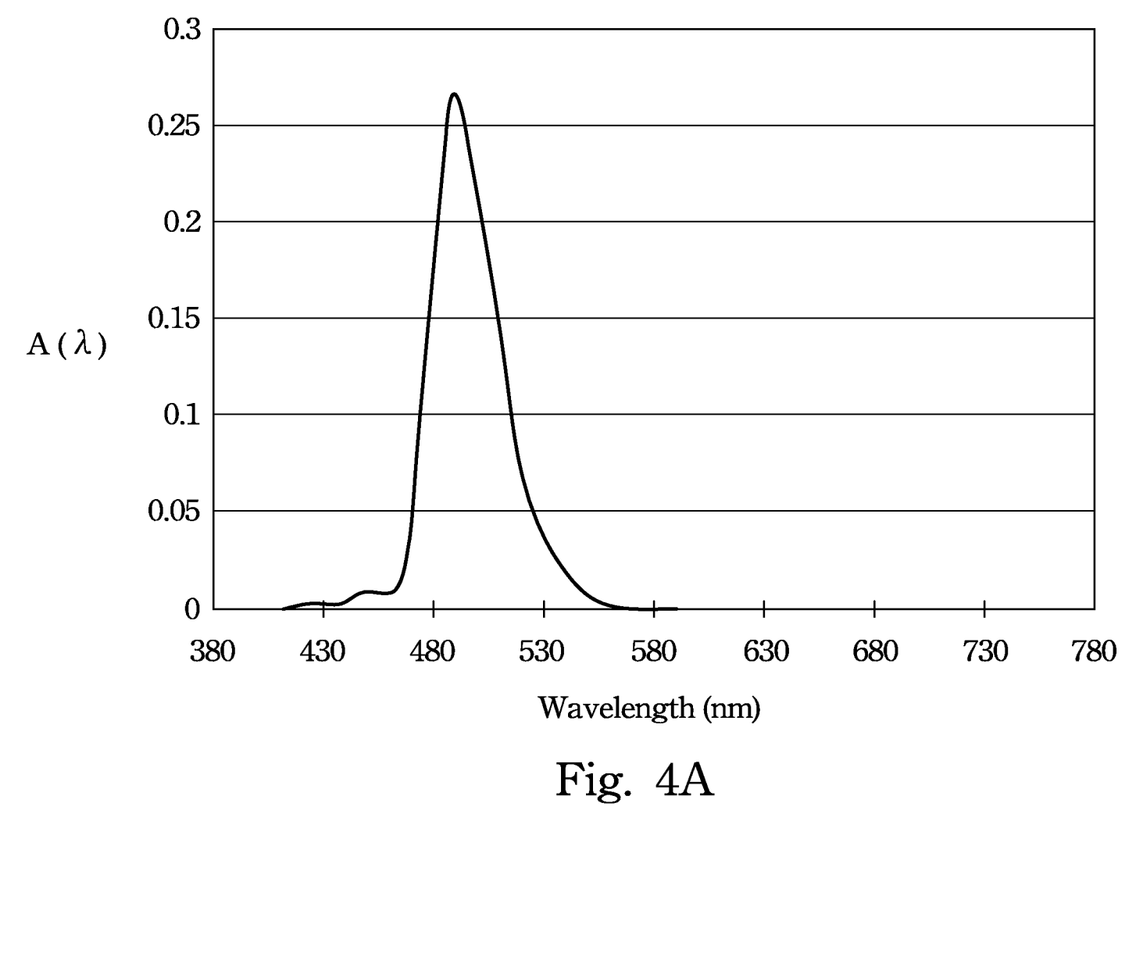
FIG. 4A is graph depicting the curve of the function $A(\lambda)$ according to one embodiment of the present disclosure.

FIG. 4A depicts the curve of the function A(λ) according to one embodiment of the present disclosure. The function A(λ) depicted in FIG. 4A is obtained by multiplying the transmittance spectrum T(λ) depicted in FIG. 2 with the color matching function $\bar{z}(\lambda)$ of the CIE 1964 10° color matching functions depicted in FIG. 3. As shown in FIG. 4A, the function A(λ), which is obtained partly from the transmittance spectrum T(λ) of the green color resist 120, has a maximum of less than 0.28 in the wavelength range of 380 nm to 780 nm. Moreover, the definite integral of the function A(λ) over wavelength λ between 380 nm and 780 nm is greater than 10.26. That is, the function A(λ) satisfies the requirements of the following formula (II):

$$\int_{380}^{780} A(\lambda) d\lambda > 10.26 \quad \text{formula (II)}.$$

In another embodiment, the function A(λ) which is obtained partly from the transmittance spectrum T(λ) of the green color resist 120, has a maximum of less than 0.27 in the wavelength range of 380 nm to 780 nm. Moreover, the definite integral of the function A(λ) over wavelength λ between 380 nm and 780 nm is greater than 10.3. That is, the function A(λ) satisfies the requirements of the following formula (II):

$$\int_{380}^{780} A(\lambda) d\lambda > 10.3 \quad \text{formula (III)}.$$

Figure 4B:
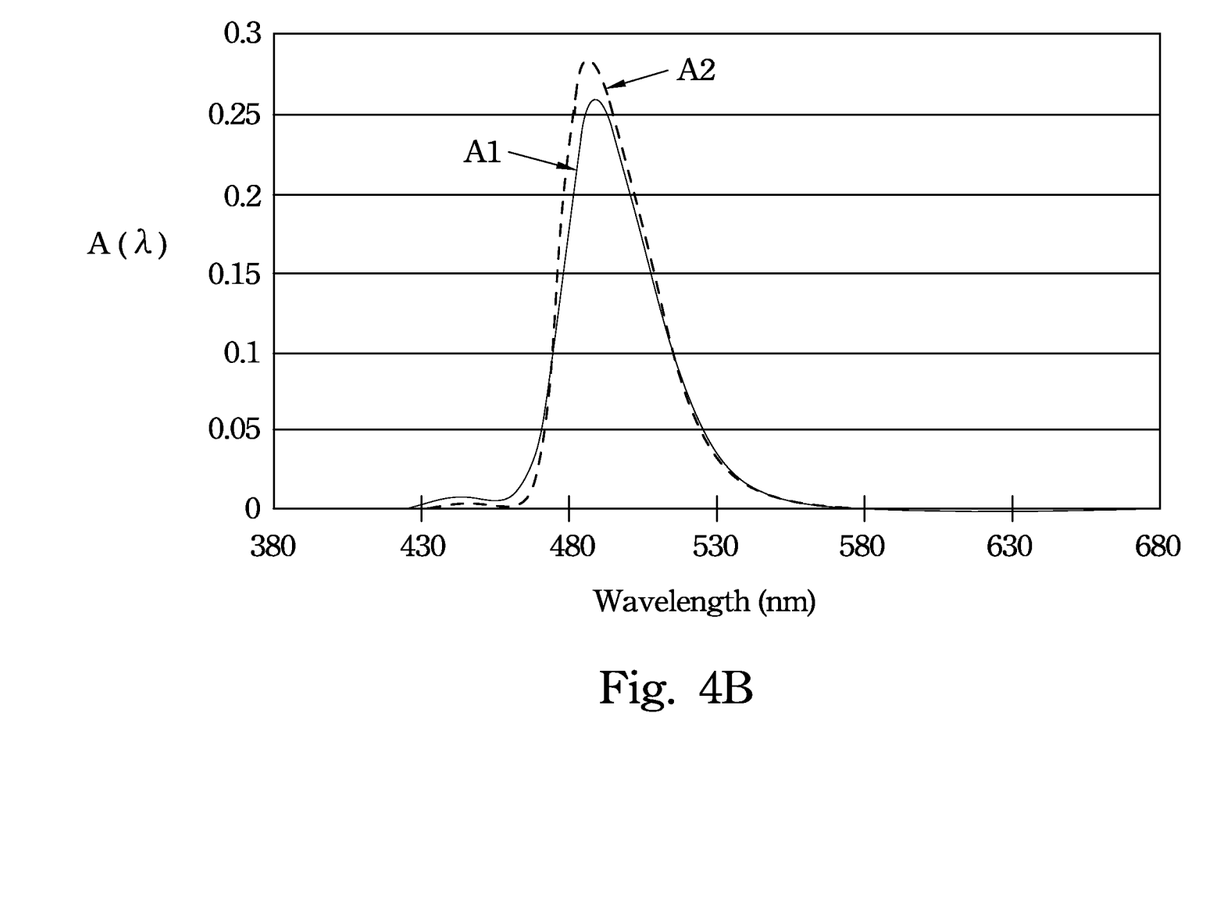
FIG. 4B is a graph comparing the function $A(\lambda)$ according to one embodiment of the present disclosure to the function $A(\lambda)$ of a conventional green color resist.

FIG. 4B is a graph comparing the function A(λ) according to one embodiment of the present disclosure to the function A(λ) of a conventional green color resist. In FIG. 4B, curve A1 represents the function A(λ) in one embodiment of the present disclosure, whereas curve A2 represents the function A(λ) of the conventional color resist. The maximum of curve A1 is about 0.261, while the maximum of curve A2 is about 0.282. In other words, the maximum of curve A1 is less than that of curve A2. However, the definite integral of the curve A1 over the wavelength λ between 380 nm and 780 nm is 10.34 (i.e., $\int_{380}^{780} A(\lambda) d\lambda > 10.34$), whereas the definite integral of curve A2 over the wavelength λ between 380 nm and 780 nm is merely 10.26 (i.e., $\int_{380}^{780} A(\lambda) d\lambda > 10.26$). That is, the definite integral of curve A1 is greater than that of curve A2, so that the chromaticity in connection with curve A1 is better than that of curve A2. The maximums and the definite integrals of curves A1 and A2 are summarized in Table 1.

TABLE 1

|  | Maximum of A (λ) | Definite integral |
|---|---|---|
| Curve A1 | 0.261 | 10.34 |
| Curve A2 | 0.282 | 10.26 |

According to one or more embodiment of the present disclosure, the transmittance spectrum T(λ) of the green color resist 120 is characterized in simultaneously increasing transmittance and improving chromaticity, but the green color resist in the prior art may not provide these technical effects. With conventional technologies, when the transmittance of the green color resist is increased, the chromaticity of the green color resist is sacrificed. On the other hand, when the chromaticity of the green color resist is improved, the transmittance of the green color resist is decreased. According to the embodiments of the present disclosure, the transmittance of the green color resist 120 may be increased without affecting, or some cases even improving, the chromaticity of the green color resist 120. This will be described in detail hereinafter.

Figure 5:
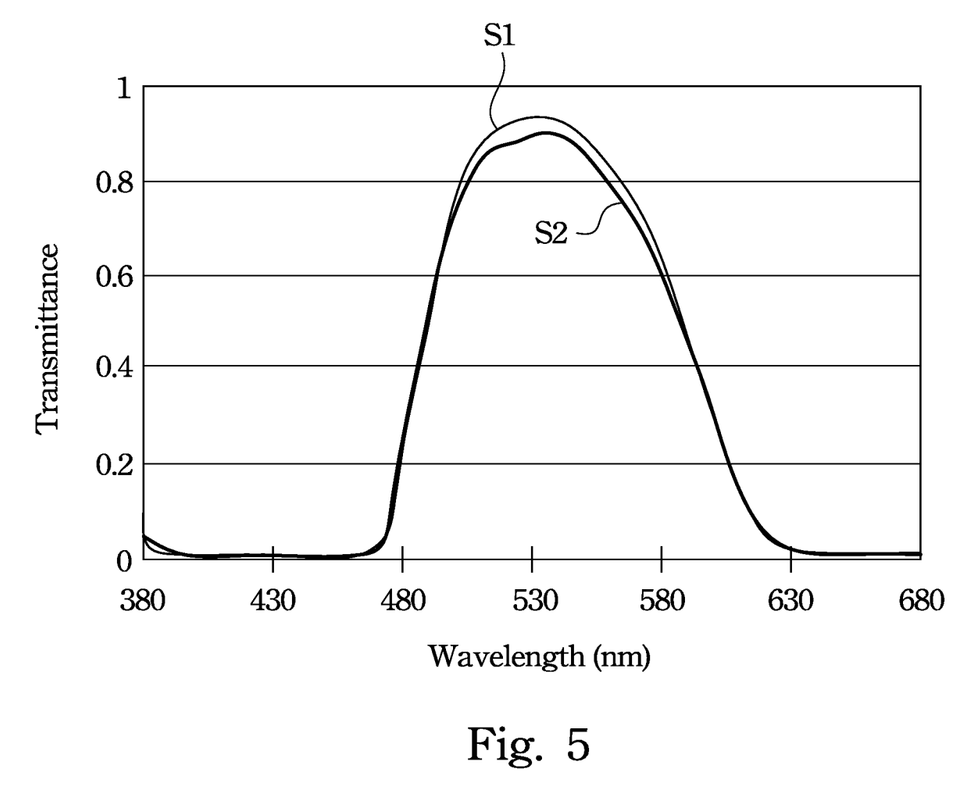
FIG. 5 is a graph comparing the transmittance spectrum of the green color resist in one embodiment of the present disclosure to the transmittance spectrum of a conventional green color resist.
Figure 6A:
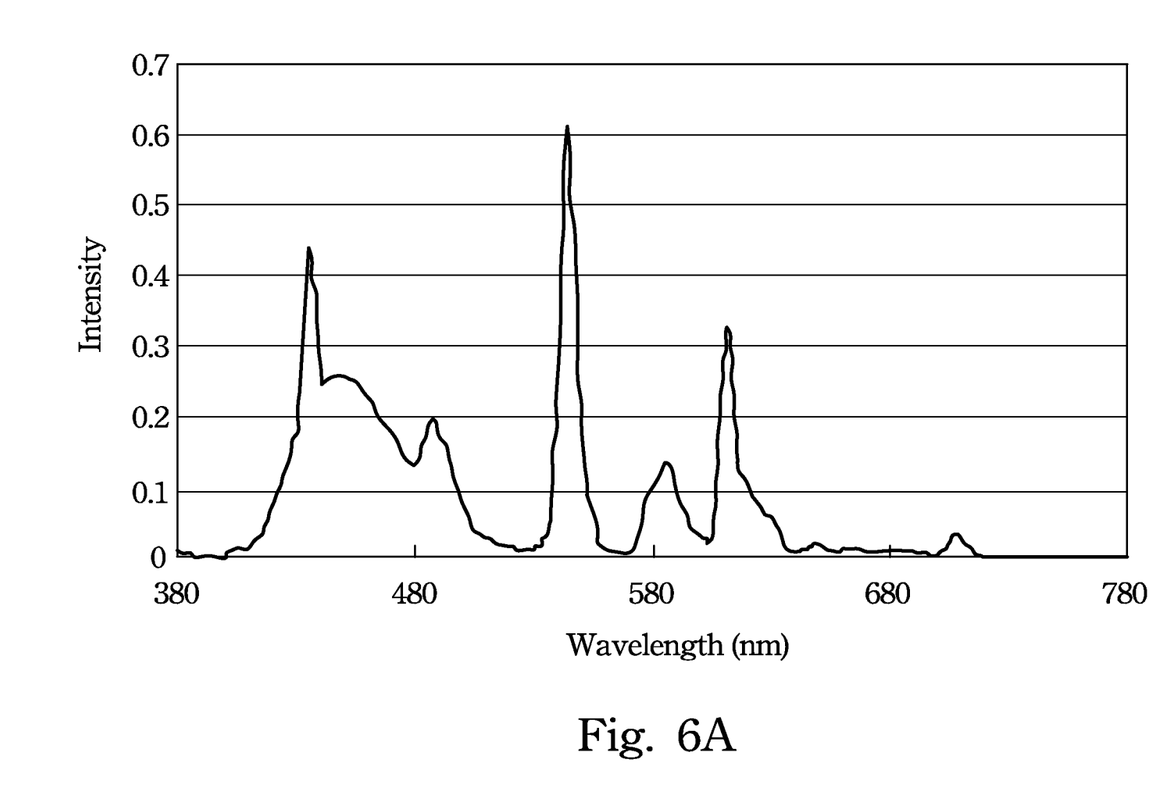
FIG. 6A is a graph showing the spectrum of a CCFL according to one embodiment of the present disclosure.

FIG. 5 is a graph comparing the transmittance spectrum S1 of the green color resist 120 in one embodiment of the present disclosure to the transmittance spectrum S2 of a conventional green color resist. Table 2 shows the Y value of the tristimulus values associated with the spectra S1, S2, in which a cold-cathode fluorescent lamp (CCFL) is used as a light source. The spectrum of the CCFL is depicted in FIG. 6A. The term "Y value of the tristimulus values" herein refers to one of the tristimulus values in the CIE XYZ color space. The Y value is a measure of the brightness or luminance of a color. Specifically, the intensity of light transmitted through the green color resists from the CCFL is increased along with an increase in the Y value. Stated differently, the brightness of the light passed through the green color resists is increased together with increases in the Y value.

TABLE 2

|  | Light source | Y value |
|---|---|---|
| The green color resist S1 in the present disclosure | CCFL | 65.39 |
| The green color resist S2 in the prior art | CCFL | 63.7 |

As shown in Table 2, the green color resist (transmittance spectrum S1) according to one embodiment of the present disclosure exhibits a high Y value of 65.39, whereas the conventional green color resist (transmittance spectrum S2) has a Y value of merely 63.7. Hence, the brightness performance of the green color resist according to the embodiment of the present disclosure is greater than that in the prior art.

Figure 6B:
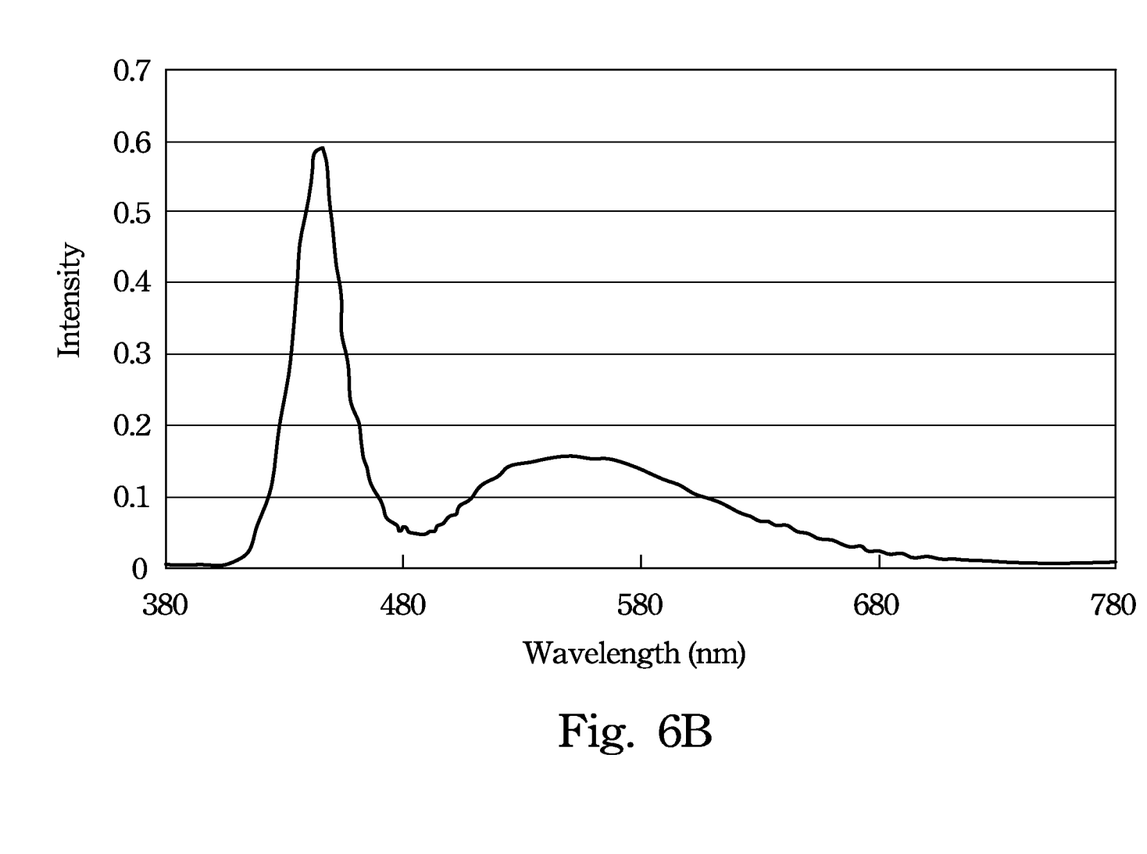
FIG. 6B is a graph showing the spectrum of a white LED according to one embodiment of the present disclosure.

While a CCFL is used as an example above, the green color resist disclosed herein is not limited to any particular light source, and a white light emitting diode (LED) may be used as the light source for the green color resist instead. In particular, a white LED may include a layer of yellow phosphor and a blue LED chip covered by the yellow phosphor. When the blue LED chip emits a blue light, the yellow phosphor is excited by the blue light and emits a yellow light, and the blue light and the yellow light are mixed to generate a white light. The spectrum of such a white LED is depicted in FIG. 6B.

In one embodiment, the green color resist 120 comprises a green pigment and a yellow dye. The green pigment cooperates with the yellow dye to provide the spectrum of the green color resist 120. In one example, the green pigment is phthalocyanine, and the yellow dye may be nitro dye, diphenylmethane dye, azo dye, thiazol, azine, acridine, quinoline or a combination thereof.

In another embodiment, the green color resist has a thickness of about 1 μm to about 3 μm.

In still another embodiment, the green color resist has a chromaticity x of 0.28 to 0.327 and a chromaticity y of 0.6 to 0.62 in the CIE 1931 chromaticity diagram, in which a CIE standard illuminant C is used as a theoretical light source.

In one embodiment, as depicted in FIG. 1, the color filter 100 further includes a red color resist 130, a blue color resist 140 and a black matrix 150. The red color resist 130, the blue color resist 140 and the black matrix 150 are disposed on the surface 111 of the substrate 110. In some embodiments, the thickness of the black matrix 150 is less than the thicknesses of the green, red and blue color resists 120, 130, 140. In one example, the black matrix 150 may be made of a black resin material. The thickness of the red and blue color resists 130, 140 may be about 1-3 μm, for example. In one example, the thickness of the blue color resist 140 is greater than that of the green color resist 120.

The color filter 100 may further include other features for the purpose of adapting to various display devices. In examples, the color filter 100 may further include a transparent conductive layer disposed on the red, green and blue color resists. Furthermore, the color filter 100 may further include patterned protrusions to form the alignment structure of the liquid crystal molecules in a multi-domain vertical alignment (MVA) display panel. Moreover, the color filter 100 may further include a number of spacers configured to form a gap between the color filter 100 and another substrate.

Figure 7:
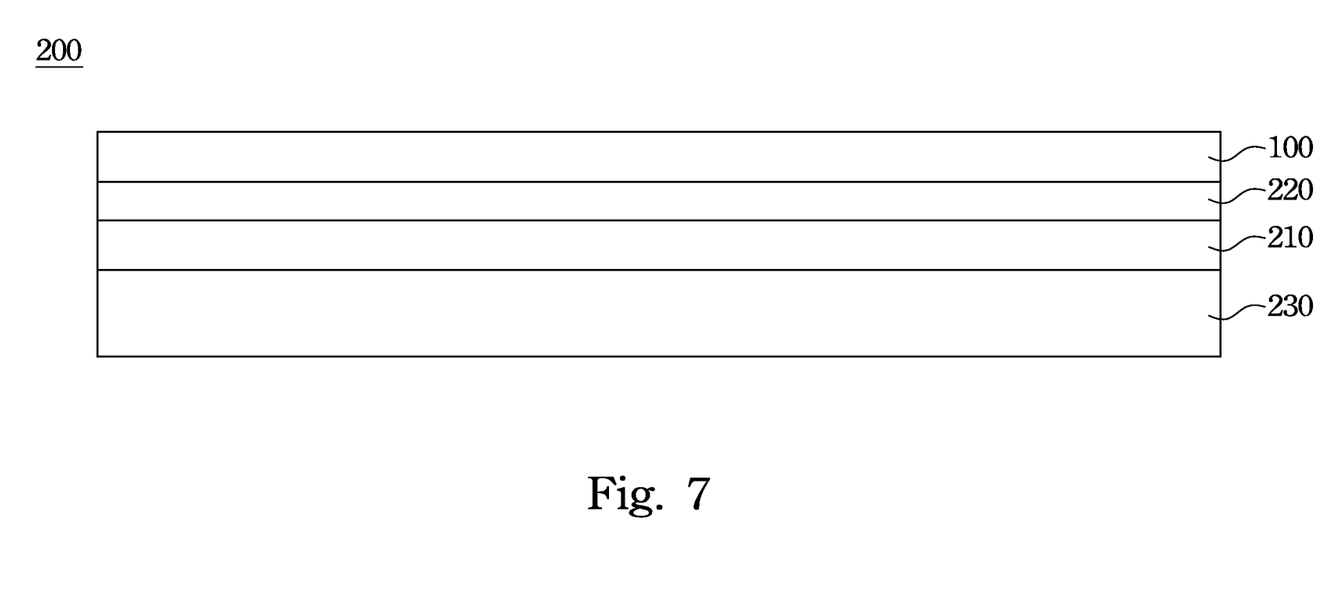
FIG. 7 is a cross-sectional view schematically illustrating a liquid crystal display device according to one embodiment of the present disclosure.

According to another aspect of the present disclosure, a liquid crystal display device 200 is provided, as depicted in FIG. 7. The liquid crystal display device 200 includes a color filter 100, an active array substrate 210, a liquid crystal layer 220 and a backlight module 230. The active array substrate 210 includes a plurality of pixel electrodes (not shown) and a plurality of active elements such as thin film transistors (not shown). Each of the pixel electrodes is electrically connected to one of the thin film transistors. The liquid crystal layer 220 is disposed on the active array substrate 210. The color filter 100 is disposed on the liquid crystal layer 220. In other words, the liquid crystal layer 220 is sandwiched between the active array substrate 210 and the color filter 100. The color filter 100 may be any embodiment or any example described hereinbefore. The backlight module 230 is arranged below the active array substrate 210, and is configured to emit a light. The backlight module 230 may include a light source such as a CCFL, LED or hot cathode fluorescent lamp (HCFL).

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A color filter, comprising:
   a substrate; and
   a green color resist disposed on a surface of the substrate, wherein the green color resist has a transmittance spectrum $T(\lambda)$ which is a function of the wavelength $\lambda$ of light passing through the green color resist, and a function $A(\lambda)$ defined by a product of the transmittance spectrum $T(\lambda)$ and a CIE color matching function $\bar{z}(\lambda)$ the function $A(\lambda)$ being represented by the following formula (I):

$$A(\lambda)=T(\lambda)\times\bar{z}(\lambda) \quad \text{formula (I)},$$

wherein the function $A(\lambda)$ has a maximum of less than 0.28 when the wavelength $\lambda$ is in the range from 380 nm to 780 nm, and the function $A(\lambda)$ satisfies the requirements of the following formula (II):

$$\int_{380}^{780} A(\lambda)d\lambda > 10.26 \quad \text{formula (II)};$$

wherein the transmittance spectrum $T(\lambda)$ has a maximum of greater than 0.9, and the transmittance spectrum $T(\lambda)$ produces a chromaticity x of 0.28 to 0.327 and a chromaticity y of 0.6 to 0.62 in the CIE 1931 chromaticity diagram, wherein a CIE standard illuminant C is used as a theoretical light source.

2. The color filter according to claim 1, wherein the green color resist comprises a green pigment and a yellow dye.

3. The color filter according to claim 2, wherein the yellow dye is selected from the group consisting of nitro dye, diphenylmethane dye, azo dye, thiazol, azine, acridine, quinoline and a combination thereof.

4. The color filter according to claim 2, wherein the green pigment is phthalocyanine.

5. The color filter according to claim 1, wherein the function $A(\lambda)$ satisfies the requirements of the following formula (III):

$$\int_{380}^{780} A(\lambda)d\lambda > 10.3 \quad \text{formula (III)}.$$

6. The color filter according to claim 1, wherein the maximum of the function $A(\lambda)$ is less than 0.27.

7. The color filter according to claim 1, wherein the green color resist has a thickness of about 1 μm to about 3 μm.

8. The color filter according to claim 1, further comprising a red color resist and a blue color resist disposed on the surface of the substrate.

9. A liquid crystal display device, comprising:
   an active array substrate;
   a liquid crystal layer disposed over the active array substrate;
   a color filter disposed over the liquid crystal layer, wherein the color filter comprises:
      a substrate; and
      a green color resist disposed on a surface of the substrate, wherein the green color resist has a transmittance spectrum $T(\lambda)$ which is a function of the wavelength $\lambda$ of light passing through the green color resist, and a function $A(\lambda)$ defined by a product of the transmittance spectrum $T(\lambda)$ and a CIE color matching function $\bar{z}(\lambda)$ the function $A(\lambda)$ being represented by the following formula (I):

$$A(\lambda)=T(\lambda)\times \bar{z}(\lambda) \qquad \text{formula (I)},$$

wherein the function A(λ) has a maximum of less than 0.28 when the wavelength λ is in the range from 380 nm to 780 nm, and the function A(λ) satisfies the requirements of the following formula (II):

$$\int_{380}^{780} A(\lambda)d\lambda > 10.26 \qquad \text{formula (II)};$$

wherein the transmittance spectrum T(λ) has a maximum of greater than 0.9, and the transmittance spectrum T(λ) produces a chromaticity x of 0.28 to 0.327 and a chromaticity y of 0.6 to 0.62 in the CIE 1931 chromaticity diagram, wherein a CIE standard illuminant C is used as a theoretical light source; and a backlight module disposed below the active array substrate and configured to emit a light.

10. The liquid crystal display device according to claim 9, wherein the green color resist comprises a green pigment and a yellow dye.

11. The liquid crystal display device according to claim 10, wherein the yellow dye is selected from the group consisting of nitro dye, diphenylmethane dye, azo dye, thiazol, azine, acridine, quinoline and a combination thereof.

12. The liquid crystal display device according to claim 10, wherein the green pigment is phthalocyanine.

13. The liquid crystal display device according to claim 9, wherein the function A(λ) satisfies the requirements of the following formula (III):

$$\int_{380}^{780} A(\lambda)d\lambda > 10.3 \qquad \text{formula (III)}.$$

14. The liquid crystal display device according to claim 9, wherein the maximum of the function A(λ) is less than 0.27.

15. The liquid crystal display device according to claim 9, wherein the green color resist has a thickness of about 1 μm to about 3 μm.

16. The liquid crystal display device according to claim 9, further comprising a red color resist and a blue color resist disposed on the surface of the substrate.

17. The color filter according to claim 1, wherein the CIE color matching function $\bar{z}(\lambda)$ is one of the CIE 1964 10° color matching functions.

18. The color filter according to claim 9, wherein the CIE color matching function $\bar{z}(\lambda)$ is one of the CIE 1964 10° color matching functions.

* * * * *